(12) United States Patent
Hung et al.

(10) Patent No.: US 12,037,452 B2
(45) Date of Patent: Jul. 16, 2024

(54) AMIDE GROUP-CONTAINING POLYETHER-ESTER MATERIAL AND PREPARATION METHOD THEREOF, MOLDED ARTICLE AND FORMING METHOD THEREOF

(71) Applicant: Far Eastern New Century Corporation, Taipei (TW)

(72) Inventors: Kun-Che Hung, Taoyuan (TW); Ya-Chun Yang, Taoyuan (TW); Chun-Hsiung Liao, Taoyuan (TW)

(73) Assignee: FAR EASTERN NEW CENTURY CORPORATION, Taipen (TW)

( * ) Notice: Subject to any disclaimer, the term of this patent is extended or adjusted under 35 U.S.C. 154(b) by 235 days.

(21) Appl. No.: 17/569,859

(22) Filed: Jan. 6, 2022

(65) Prior Publication Data
US 2022/0306801 A1   Sep. 29, 2022

(30) Foreign Application Priority Data

Mar. 25, 2021 (TW) .................. 110110901

(51) Int. Cl.
| | | |
|---|---|---|
| C08G 63/00 | (2006.01) | |
| B01J 21/06 | (2006.01) | |
| B01J 23/18 | (2006.01) | |
| C08G 63/91 | (2006.01) | |

(52) U.S. Cl.
CPC .......... C08G 63/916 (2013.01); B01J 21/063 (2013.01); B01J 23/18 (2013.01)

(58) Field of Classification Search
CPC ...... C08G 63/88; C08G 63/91; C08G 63/912; C08G 63/914; C08G 63/916
See application file for complete search history.

(56) References Cited

U.S. PATENT DOCUMENTS

| | | | |
|---|---|---|---|
| 5,525,683 A * | 6/1996 | Adkins .................. | C08G 63/91 525/437 |
| 7,056,493 B2 | 6/2006 | Kohn | |
| 7,795,320 B2 | 9/2010 | Determan | |
| 8,110,609 B2 | 2/2012 | Determan | |
| 9,896,540 B2 | 2/2018 | Tabor | |
| 9,951,171 B2 | 4/2018 | Tabor | |
| 2013/0090449 A1 * | 4/2013 | Whitehouse ....... | C08G 18/4018 560/182 |
| 2020/0140609 A1 * | 5/2020 | Flores Penalba .... | C08G 63/912 |

FOREIGN PATENT DOCUMENTS

| | | |
|---|---|---|
| CN | 1168898 A | 12/1997 |
| CN | 104725260 B | 8/2017 |
| JP | 2012072400 A | 4/2012 |
| TW | I596133 B | 8/2017 |
| TW | I613252 B | 2/2018 |

OTHER PUBLICATIONS

Bettinger, Biomaterials 29 (2008) 2315-2325 (Year: 2008).*
Jamdar, Journal of Polymers and the Environment (2018) 26:2601-2618 (Year: 2018).*
A. A. Deschamps, "Phase Separation and Physical Properties of PEO-Containing Poly(ether ester amide)s", Journal, 2002, 1337-1352, vol. 13, No. 12, Journal of Biomaterials Science—Polymer Edition.
A. A. Deschamps, "Poly(ether ester amide)s for Tissue Engineering", Journal, 2003, 2643-2652, vol. 24, Biomaterials.
J. M. Bezemer, "Amphiphilic poly(ether ester amide) Multiblock Copolymers as Biodegradable Matrices for the Controlled Release of Proteins", Paper, 2000, 8-17, John Wiley & Sons, Inc.
Kai Guo, "Copolymers of Unsaturated and Saturated Poly(ether ester amide)s: Synthesis, Characterization, and Biodegradation", Journal, 2008, 1858-1869, vol. 110, Journal of Applied Polymer Science.
Kai Guo, "Synthesis, Characterization, and Biodegradation of Novel Poly(ether ester amide)s Based on L-Phenylalanine and Oligoethylene Glycol", Journal, 2007, 2851-2861, vol. 8, Biomacromolecules.
Chun Yu, "Tyrosine-PEG-derived Poly(ether carbonate)s as New Biomaterials Part I: Synthesis and Evaluation", Journal, 1999, 253-264, vol. 20, Biomaterials.
N. S. Murthy, "Microphase Separation in Copolymers of Hydrophilic PEG Blocks and Hydrophobic Tyrosine-Derived Segments using Simultaneous SAXS/WAXS/DSC", Journal, 2010, 3978-3988, vol. 51, Polymer.
M. C. E. J. Niesten, "Synthesis and Properties of Segmented Copolymers having Aramid Units of Uniform Length", Journal, 2000, 8487-8500, vol. 41, Polymer.
Debby Husken, "Hydrophilic Segmented Block Copolymers Based on Poly(ethylene oxide) and Monodisperse Amide Segments", Journal, 2007, 4522-4535, vol. 45, Journal of Polymer Science: Part A: Polymer Chemistry.
Debby Husken, "The Structure of Water in PEO-Based Segmented Block Copolymers and its Effect of Transition Temperatures", Journal, 2008, 967-979, vol. 209, Macromolecular Chemistry and Physics.
D. Husken, "Water Vapor Transmission of Poly(ethylene oxide)-Based Segmented Block Copolymers", Journal, 2009, 2143-2150, vol. 112, Journal of Applied Polymer Science.
Magda E. Tawfik, "Chemical Recycling of Poly(ethylene terephyhalate) Waste using Ethanolamine Sorting of the End Products", Journal, 2010, 187-194, vol. 95, Polymer Degradation and Stability.
Kap Jin Kim, "Degradation Mechanism and Morphological Change of PET by PEG-Diamine", Journal, 1989, 2855-2871, vol. 37, Journal of Applied Polymer Science.

* cited by examiner

Primary Examiner — Robert C Boyle
(74) Attorney, Agent, or Firm — Hayes Soloway PC

(57) ABSTRACT

An amide-group containing polyether-ester material, a preparation method thereof, a molded article and a forming method thereof are provided. The amide-group containing polyether-ester material has an amide group content ranging from 0.5 to 20 mol % and a work of rupture greater than or equal to 90 MJ/m$^3$. The molded article includes the amide-group containing polyether-ester material.

13 Claims, 3 Drawing Sheets

AMIDE GROUP-CONTAINING POLYETHER-ESTER MATERIAL AND PREPARATION METHOD THEREOF, MOLDED ARTICLE AND FORMING METHOD THEREOF

CROSS-REFERENCE TO RELATED APPLICATION

This application claims priority to Taiwan Application Serial Number 110110901, filed Mar. 25, 2021, which is herein incorporated by reference.

BACKGROUND

Field of Invention

The present disclosure relates to an amide group containing polyether-ester material and a preparation method thereof. The present disclosure also relates to a molded article and a forming method thereof.

Description of Related Art

Thermoplastic polyester elastomers (TPEEs) have excellent heat resistance, resilience and chemical resistance. TPEEs are also easy to be processed and shaped by injection, extrusion, compression and blow molding. Thus, TPEEs are widely used in textiles, automotive materials, packaging materials and shoes materials, resulting in an increasing demand for high-performance thermoplastic polyester elastomers.

Thermoplastic polyester elastomers are mainly composed of a hard segment having a relatively rigid molecular chain and a soft segment having a relatively soft molecular chain. The variation in the structure of the hard and soft segments may alter the physical properties of thermoplastic polyester elastomers. Generally, the hard segment of the thermoplastic polyester elastomer may comprise an aromatic polyester such as poly(ethylene terephthalate) (PET), poly(trimethylene terephthalate) (PTT), poly(butylene terephthalate) (PBT), etc., while the soft segment may comprise a hydroxyalkane oligomer such as poly(ethylene glycol) or poly(tetramethylene ether) glycol, etc.

The physical properties of the thermoplastic polyester elastomer can be adjusted by, for example, adjusting the ratio of the hard segment to the soft segment or replacing the structure of the thermoplastic polyester elastomer. However, most of the current thermoplastic polyester elastomer has a hard segment of PET or PBT due to factors such as mechanical strength, heat resistance, and cost, such that the mechanical strength and hardness of the thermoplastic polyester elastomer are limited. In addition, when the soft segment content is reduced for increasing the mechanical strength and the hardness of the thermoplastic polyester elastomer, some properties of the thermoplastic polyester elastomer, such as elongation and work of rupture, may be decreased.

TW1596133 discloses a polyester elastomer with a molecular structure having an amide oligomer, a polyalkylene glycol and a polyaromatic diacid alkane diol, where the amide oligomer is composed of caprolactam and adipic acid, and the amide group is bonded to an aliphatic functional group. However, it is noted that the polyether-ester material of the present disclosure does not contain caprolactam and adipic acid, and the amide group in the polyether-ester material of the present disclosure is bonded to an aromatic polyester functional group. Thus, the polyether-ester material of the present disclosure has a structure that differs from the structure of the related art.

TW1613252 discloses the use of a polyetheramine (or polyol) for PET depolymerization. The polyetheramine has a molecular weight in a range of 250 to 6,000 and is selected from the group consisting of polyoxyalkylene diamine or triamine. However, it is noted that the polyether-ester material of the present disclosure is using of a monoamino alcohol. Thus, the polyether-ester material of the present disclosure differs from the related art.

CN1168898A discloses a method of preparing polyamide by substituting a portion of a diol with a diamine compound. However, it is noted that the present disclosure uses a monoamino alcohol, and thus there is a significant difference between the method of the related art and the present disclosure. CN104725260B discloses a method of synthesizing an unsaturated resin from degraded PET that the monoethanolamine and glycol are simultaneously added for PET depolymerization. However, an additional dibasic acid is required for synthesizing the unsaturated resin, and a tin-containing catalyst, which has biotoxicity must be used to achieve the depolymerization.

In view of this, there is a need for a thermoplastic polyether-ester elastomer having excellent mechanical strength, elongation and work of rupture.

SUMMARY

The present disclosure provides a method of preparing an amide group containing polyether-ester material. The method includes the steps of: (1) mixing a polyester, a monoamino alcohol, and a hydroxyalkane to form a first mixture, and based on 1 mole of a total amount of the polyester, a relative molar amount of the monoamino alcohol is in a range of 0.01 to 0.2 mole; (2) heating the first mixture to proceed a depolymerization reaction and then to form a depolymerization product, where an amine value of the depolymerization product is in a range of 1.3 to 54 mg KOH/g; (3) mixing the depolymerization product and a hydroxyalkane oligomer to form a second mixture; and (4) performing a condensation polymerization reaction of the second mixture to obtain an amide group containing polyether-ester material.

In one or more embodiments, the polyester has a benzene ring structure including a para substituent, a meta substituent, or a combination thereof.

In one or more embodiments, the polyester is obtained by an esterification reaction of a carboxylic acid and an alcohol, or is obtained by plastic recycling.

In one or more embodiments, an amine group content of the monoamino alcohol is at least 5 meq/g.

In one or more embodiments, the amine group content of the monoamino alcohol is in a range of 5 meq/g to 30 meq/g.

In one or more embodiments, the monoamino alcohol is selected from the group consisting of monoethanolamine (16 meq/g), diethanolamine (10 meq/g), triethanolamine (7 meq/g), n-propanolamine (13 meq/g), isopropanolamine (13 meq/g), n-butanolamine (11 meq/g), isobutanolamine (11 meq/g), and any combinations thereof.

In one or more embodiments, the hydroxyalkane is selected from the group consisting of ethylene glycol, diethylene glycol, triethylene glycol, 1,2-propanediol, 1,3-propanediol, 1,2-butanediol, 1,3-butanediol, 1,4-butanediol, 1,5-pentanediol, 1,6-hexanediol, 2-methyl-1,3-propanediol, neopentyl glycol, and any combinations thereof.

In one or more embodiments, a number average molecular weight of the hydroxyalkane oligomer is in a range of 600 to 2,000.

In one or more embodiments, the hydroxyalkane oligomer is selected from the group consisting of poly(ethylene glycol), poly(trimethylene ether) glycol, and poly(tetramethylene ether) glycol.

In one or more embodiments, the step (1) includes adding a first catalyst, where the first catalyst is a monovalent metal compound, a divalent metal compound, or a combination thereof excluding a tin-containing metal compound.

In one or more embodiments, the step (1) includes adding a first catalyst, where the first catalyst is a titanium-containing compound, an antimony-containing compound, or a combination thereof.

In one or more embodiments, the second mixture of the step (3) further includes an antioxidant.

In one or more embodiments, the step (3) includes adding a second catalyst, where the second catalyst is a monovalent metal compound, a divalent metal compound, or a combination thereof excluding a tin-containing metal compound.

In one or more embodiments, the step (3) includes adding a second catalyst, where the second catalyst is a titanium-containing compound, an antimony-containing compound, or a combination thereof.

In one or more embodiments, the step (4) comprises heating the second mixture at a temperature in a range of 230° C. to 250° C.

Another aspect of the present disclosure relates to an amide group containing polyether-ester material. The polyether-ester material has an amide group content ranging from 0.5 to 20 mol % and a work of rupture greater than 90 $MJ/m^3$. The polyether-ester material includes a hard segment structure and a soft segment structure, and the hard segment structure includes an aromatic polyester functional group and an amide group, and the soft segment structure includes a long chain ether structure.

In one or more embodiments, a ratio of the hard segment structure to the soft segment structure, in parts by weight, is in a range of 1.2:1 to 25:1.

In one or more embodiments, a tensile strength of the polyether-ester material has a tensile strength greater than 20 MPa and an elongation is greater than 400%.

Another aspect of the present disclosure relates to a method of forming a molded article. This method includes providing the amide group containing polyether-ester material; and performing injection molding, extrusion molding, compression molding, blow molding, foaming, light curing, or 3D printing on the amide group containing polyether-ester material to form a molded article.

The present disclosure also relates to a molded article including the amide group containing polyether-ester material.

In one or more embodiments, the molded article includes a fiber, a fabric, a film, a sheet, or a foam.

The molded article may be formed by the molding method to become a part or a component having a certain shape, having excellent performance in tensile strength, elongation, and work of rupture, and thus is suitable for manufacturing sporting goods, such as sports shoe parts (upper, outsole, midsole, heel, inner lining), orthopedic shoes or rigid protective shoes and body protection items.

In the method of the present disclosure, an additional dibasic acid is not required for esterification, and the depolymerization is performed with the use of an environmentally friendly titanium catalyst. A weight ratio of amine to alcohol in the method of the present disclosure also differs from that of the related art. Therefore, it shall be apparent to a person skilled in the art that there are significant differences between the related art and the present disclosure.

BRIEF DESCRIPTION OF THE DRAWINGS

In order to make the features, advantages and embodiments of the present disclosure more comprehensible, the description of the attached drawings is as follows.

DETAILED DESCRIPTION

Figure 1:
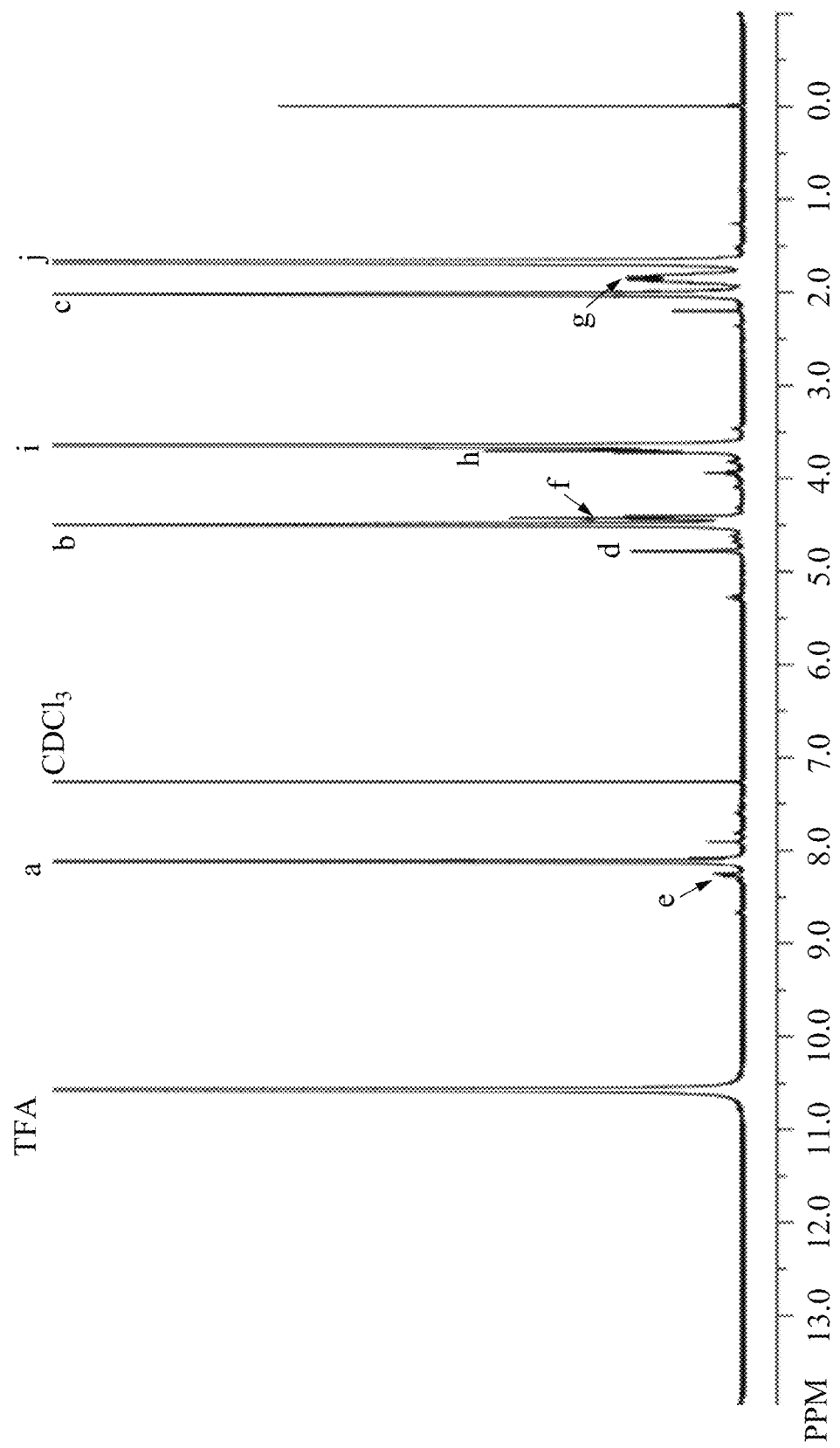
FIG. 1 is a nuclear magnetic resonance spectra of Example 1 in the present disclosure.

The present disclosure provides a method of preparing a polyether-ester materials containing an amide group. This method includes steps (1) to (4).

In step (1), a polyester, a monoamino alcohol, and a hydroxyalkane are mixed to form a first mixture. Based on 1 mole of a total amount of the polyester, a relative molar amount of the monoamino alcohol is in a range of 0.01 to 0.2 mole, preferably in a range of 0.02 to 0.18 mole, such as 0.04, 0.07, 0.09 or 0.15 mole. When the relative molar amount of the monoamino alcohol is less than 0.01 mole, mechanical properties of the product such as tensile strength, elongation, and work of rupture may be insufficient. When the relative molar amount of the monoamino alcohol is greater than 0.2 mole, the product may not be successfully polymerized.

In one or more embodiments, the polyester has a benzene ring structure including a para substituent, a meta substituent, or a combination thereof. In one or more embodiments, the polyester includes poly(ethylene terephthalate), poly (butylene terephthalate), or poly(trimethylene terephthalate). In one or more embodiments, the polyester is obtained by an esterification reaction of a carboxylic acid and an alcohol. In other words, the polyester is formed by conventional process. In one or more embodiments, the polyester is obtained by plastic recycling, and the polyester is recycled polyester.

In one or more embodiments, an amine group content of the monoamino alcohol is in a range of 5 meq/g to 30 meq/g, preferably is in a range of 8 to 25 meq/g. In one or more embodiments, the monoamino alcohol is selected from the group consisting of monoethanolamine (16 meq/g), diethanolamine (10 meq/g), triethanolamine (7 meq/g), n-propanolamine (13 meq/g), isopropanolamine (13 meq/g), n-butanolamine (11 meq/g), isobutanolamine (11 meq/g), and any combinations thereof.

In one or more embodiments, a boiling point of the hydroxyalkane is in a range of 180° C. to 290° C. In one or more embodiments, the hydroxyalkane is selected from the group consisting of ethylene glycol, diethylene glycol, triethylene glycol, 1,2-propanediol, 1,3-propanediol, 1,2-butanediol, 1,3-butanediol, 1,4-butanediol, 1,5-pentanediol, 1,6-hexanediol, 2-methyl-1,3-propanediol, neopentyl glycol, and any combinations thereof. In one or more embodiments, step (1) includes adding a first catalyst, where the first catalyst is a monovalent metal compound, a divalent metal compound, or a combination thereof excluding a tin-containing metal compound. In other embodiments, step (1) includes adding a first catalyst, where the first catalyst is a titanium-containing compound, an antimony-containing compound, or a combination thereof.

Next, in step (2), the first mixture is heated to proceed a depolymerization reaction and then to form a depolymerization product. The depolymerization product has an amine value in a range of 1.3 to 54 mg KOH/g, such as 1.9, 2.7, 4, 5.4, 8, 13.4, 16.1, 21.4, 29.5, 40.2, 45.6 or 48.2 mg KOH/g. Specifically, in the step (2), the polyester in the first mixture may undergo a depolymerization reaction. For example, the polyester in the first mixture may undergo an aminolysis reaction with the monoamino alcohol to form a first depolymerized product containing an amide group. In addition, the polyester in the first mixture may also undergo an alcoholysis reaction with the hydroxyalkane to form a second depolymerized product containing an ester group. In some embodiments, step (2) includes heating the first mixture under a temperature in a range of 150° C. to 160° C. for 1 to 2 hours to form a pre-depolymer, followed by heating the pre-depolymerization product under a temperature in a range of 200° C. to 220° C. for 3 to 4 hours to form the depolymerization product.

Next, in step (3), the depolymerization product is mixed with a hydroxyalkane oligomer to form a second mixture. In one or more embodiments, the hydroxyalkane oligomer has a number average molecular weight in a range of 600 to 2,000. In one or more embodiments, the hydroxyalkane oligomer is selected from the group consisting of poly(ethylene glycol), poly(trimethylene ether) glycol, and poly(tetramethylene ether) glycol.

In one or more embodiments, the second mixture of the step (3) further includes an antioxidant. In one or more embodiments, the antioxidant includes a hindered phenol antioxidant and a phosphate ester antioxidant. In one embodiment, the hindered phenol antioxidant includes an antioxidant with the trade name of IRGANOX® 1098. In another embodiment, the phosphate ester antioxidant includes an antioxidant with the trade name of Revonox® 608. In one or more embodiments, step (3) includes adding a second catalyst, where the second catalyst is a monovalent metal compound, a divalent metal compound, or a combination thereof excluding a tin-containing metal compound. In other embodiments, step (3) includes adding a second catalyst, where the second catalyst is a titanium-containing compound, an antimony-containing compound, or a combination thereof.

Next, in the step (4), a condensation reaction of the second mixture is performed to obtain the polyether-ester material with an amide group content in a range of 0.5 to 20 mol %. In detail, the first depolymerized product (which contained the amide group and formed in step (2)) and the hydroxyalkane oligomer may undergo a condensation reaction to form the amide group containing polyether-ester material. In addition, the second depolymerized product (which contained the ester group and formed in step (2)) and the hydroxyalkane oligomer may also undergo a condensation reaction. In one or more embodiments, step (4) comprises heating the second mixture under a temperature in a range of 230° C. to 250° C. for 3 hours to 4 hours.

The amide group containing polyether-ester material, as formed by the method of the present disclosure, has an amide group content in the range of 0.5 to 20 mol %, such as 0.7, 1.0, 1.5, 2, 3, 5, 6, 8, 11, 15, 17 or 18 mol %. It is noted that the range of the amide group content may provide advantageous technical effects. Specifically, the amide group containing polyether-ester material, as formed by the method of the present disclosure, has excellent mechanical strength, hardness, elongation, and work of rupture.

Another aspect of the present disclosure relates to an amide group containing polyether-ester material. The polyether-ester material may be used for shoes. The amide group containing polyether-ester material has an amide group content in a range of 0.5 to 20 mol %, such as 0.7, 1.0, 1.5, 2, 3, 5, 6, 8, 11, 15, 17 or 18 mol %. It is noted that when the amide group content of the amide group containing polyether-ester material is less than 0.5 mol %, mechanical properties of the product, such as tensile strength, elongation and work of rupture, may be insufficient. When the amide group content of the amide group containing polyether-ester material is greater than 20 mol %, the material may not be successfully polymerized.

The amide group containing polyether-ester material includes a hard segment structure and a soft segment structure. The hard segment structure includes an aromatic polyester functional group and an amide group, and the soft segment structure includes a long chain ether structure. In one or more embodiments, the aromatic polyester is poly(ethylene terephthalate), poly(butylene terephthalate), or poly(trimethylene terephthalate). In one or more embodiments, the long-chain ether structure includes a C2-C20 long-chain ether.

In one or more embodiments, a ratio of the hard segment structure to the soft segment structure, in parts by weight, is in a range of 1.2:1 to 25:1, preferably 1.4:1 to 22:1, such as 2:1, 4:1, 5:1 or 6:1. When the ratio of the hard segment structure to the soft segment structure, in parts by weight, is less than 1.2:1, the product may have insufficient mechanical strength and hardness. When the ratio the hard segment structure to the soft segment structure, in parts by weight, is greater than 25:1, the product may have low elongation. The ratio range of the hard segment structure to the soft segment structure, in parts by weight, may provide specific advantageous technical effects, such as providing excellent mechanical strength, hardness, excellent elongation and work of rupture. Furthermore, the ratio range of the hard segment structure to the soft segment structure increases the microphase separation between the hard segment and the soft segment in the material structure. According to general knowledge in the art, the hard segment in the thermoplastic elastomer can maintain the mechanical strength of the thermoplastic elastomer, while the soft segment can maintain the flexibility of the thermoplastic elastomer. Therefore, when the microphase separation between the hard and soft segments of the thermoplastic elastomer is large, an interaction force between the hard and soft segments is lower, such that the mechanical properties of the elastomer are improved.

Because the amide group containing polyether-ester material of the present disclosure has the relatively high microphase separation, it exhibits both high mechanical strength and high elongation and is suitable for a variety of fields, such as shoe parts, automotive materials, packaging materials and fabrics, etc. In one or more embodiments, the ratio of the hard segment structure to the soft segment structure in the amide group containing polyether-ester material of the present disclosure, in of parts by weight, is in the range of from 1.2:1 to 25:1. The polyether-ester material has a tensile strength greater than 20 MPa, an elongation greater than 400%, and a work of rupture greater than 90 MJ/m$^3$.

Another aspect of the present disclosure relates to a method of forming a molded article. This method includes providing the amide group containing polyether-ester material; and performing injection molding, extrusion molding, compression molding, blow molding, foaming, light curing, or 3D printing on the amide group containing polyether-ester material to form a molded article.

The present disclosure also relates to a molded article including the amide group containing polyether-ester material. In one or more embodiments, the molded article includes, for example, a fiber, a fabric, a film, a sheet, or a foam.

The following embodiments are used to describe specific aspects of the present disclosure and enable those skilled in the art to implement the present disclosure. The following embodiments should not be construed as limitations of the present disclosure.

1. Test Method of Material Property
   (1) Nuclear magnetic resonance spectrometer: $CDCl_3$ is used as a solvent to analyze a chemical structure of a polymer to determine the amide group content in the polyether-ester product and the residual amount of PET.
   (2) Tensile testing machine: According to the standard test method ASTM D412, tensile strength (stress, unit of MPa), elongation (unit of %) and work of rupture (unit of $MJ/m^3$) of the polymer are obtained, and the work of rupture is an area under a curve of a stress-strain graph.
   (3) Hand-held hardness tester: According to the standard test method ASTM D2240, a Type D hardness tester is used for material hardness measurement.
   (4) Dynamic mechanical analyzer: A heating rate is 10° C./min scanning from −50° C. to 80° C., and a strain is 0.1%, and a frequency is 1 Hz to analyze dynamic mechanical properties of the polymer, and obtained tan δ could be used to determine a glass transition temperature (Tg) of a soft segment of the polymer. The glass transition temperature difference (ΔTg) between the hard and soft segments is the glass transition temperature of the hard segment (65° C.) minus that of the soft segment.
   (5) Differential scanning calorimeter: A heating rate is 10° C./min scanning from −50° C. to 250° C. to analyze a melting point and enthalpy (ΔH) of the polymer.
   (6) Intrinsic viscosity: A material is dissolved in a solvent of phenol/1,1,2,2-tetrachloroethane (60:40) with a concentration of 0.125 g/25 ml, and an Oswa viscometer is used to measure the intrinsic viscosity.
   (7) Amine value of depolymer: About 2 g of a sample is placed in a conical flask, and 50 ml of absolute ethanol is added and heated to dissolve the sample. 5 drops of bromophenol blue indicator solution are added after dissolution. Hydrochloric acid is used as a standard titration solution. The standard titration solution is dropped into the conical flask until the solution in the conical flask turned yellow and did not fade within 10 seconds as the end point of the titration. The amine value is calculated by the following formula: Amine value=(used volume of standard titration solution)×(concentration of standard titration solution)×56.1/(sample weight).

2. Experimental Materials
   (1) Poly(ethylene terephthalate) (PET): Model CB-602R, from Far Eastern New Century Corporation.
   (2) Monoethanolamine (MEA) with a number average molecular weight of 61.08 g/mol, purchased from Oriental Union Chemical Corporation.
   (3) Diethanolamine (DEA) with a number average molecular weight of 105.14 g/mol, purchased from Oriental Union Chemical Corporation.
   (4) Triethanolamine (TEA) with a number average molecular weight of 149.19 g/mol, purchased from Oriental Union Chemical Corporation.
   (5) 1,4-butanediol (BDO) with a number average molecular weight of 90.12 g/mol, purchased from Echo Chemical Co., Ltd.
   (6) 1.6-hexanediol (HDO) with a number average molecular weight of 118.17 g/mol, purchased from UBE.
   (7) Neopentyl glycol (NPG) with a number average molecular weight of 104.15 g/mol, purchased from Shuennyang Co., Ltd.
   (8) Jeffamine® D-230 with a number average molecular weight of 230 g/mol, purchased from Huntsman.
   (9) Jeffamine® D-2000 with a number average molecular weight of 2,000 g/mol, purchased from Huntsman.
   (10) Poly(tetramethylene ether) glycols with number average molecular weights of 650, 1000 and 2,000 g/mol, purchased from Echo Chemical Co., Ltd.
   (11) Titanium tetraisopropanolate as a catalyst, purchased from Sigma-Aldrich.
   (12) Irganox® 1098 as an antioxidant, purchased from BASF.
   (13) Revonox® 608 as an antioxidant, purchased from Chitec Technology Co., Ltd.

Example 1

First, depolymerization reaction was performed. 250 g of poly(ethylene terephthalate), 2.4 g of monoethanolamine (a molar ratio of poly(ethylene terephthalate) to monoethanolamine (PET/MEA) was 1 mol/0.03 mol), 293 g of 1,4-butanediol and an appropriate amount of a titanium tetraisopropanolate catalyst were added to a reactor. The temperature was raised to 150° C.-160° C. for a first stage of a depolymerization reaction, and the reaction time was 1 hour. The temperature was then raised to 210° C.-220° C. for a second stage of the depolymerization reaction, and the reaction time was 3 hours. After the depolymerization reaction was completed (when the reaction solution became clear), 190 g of poly(tetramethylene ether) glycol (with a ratio of the hard segment to the soft segment, in parts by weight, is 60:40 w/w), an appropriate amount of the titanium tetraisopropanolate catalyst, two antioxidants (i.e., Irganox® 1098 and Revonox® 608) were added to the reactor for polymerization. The reaction temperature was 240° C., and the vacuum pressure was reduced to about 1 torr. The polyether-ester containing an amide group was formed after 4 hours.

Examples 2-3

Preparation methods of Examples 2-3 are similar to that of Example 1, except that the number average molecular weight of poly(tetramethylene ether) glycol of Example 2 and Example 3 were changed to 650 g/mol and 2,000 g/mol, respectively.

Examples 4-8

Preparation methods of Examples 4-8 are similar to that of Example 1, except that the molar ratios of PET/MEA were changed to 1 mol/0.035 mol, 1 mol/0.04 mol, 1 mol/0.05 mol, 1 mol/0.1 mol, and 1 mol/0.2 mol, respectively.

Example 9

A preparation method of Example 9 is similar to that of Example 1, except that the molar ratio of PET/MEA is 1 mol/0.01 mol, and an addition amount of poly(tetramethylene ether) glycol was reduced to 50 g, so that a ratio of parts by weight of the hard segment to the soft segment is 83.2:16.8.

Examples 10-14

A preparation method of Example 10 is similar to that of Example 9, except that an addition amount of poly(tetramethylene ether) glycol was reduced to 31 g, so that a ratio of the hard segment to the soft segment, in parts by weight, is 95.5:4.5.

A preparation method of Example 11 is similar to that of Example 1, except that monoamino alcohol was replaced with 4.1 g of diethanolamine (a molar ratio of poly(ethylene terephthalate) to diethanolamine (PET/DEA) is 1 mol/0.03 mol).

A preparation method of Example 12 is similar to that of Example 1, except that the monoamino alcohol was replaced with 5.8 g of triethanolamine (a molar ratio of poly(ethylene terephthalate) to triethanolamine (PET/TEA) is 1 mol/0.03 mol).

A preparation method of Example 13 is similar to that of Example 1, except that 293 g of 1,4-butanediol was replaced with 234.4 g of 1,4-butanediol and 58.6 g of neopentyl glycol.

A preparation method of Example 14 is similar to that of Example 1, except that 293 g of 1,4-butanediol was replaced with 205.1 g of 1,4-butanediol, 58.6 g of 1,6-hexanediol and 29.3 g of neopentyl glycol.

Comparative Examples 1-2

Preparation methods of Comparative Examples 1-2 are similar to in Example 1, except that in Comparative Example 1, no monoethanolamine was added (i.e., PET/MEA=1 mol/0 mol), while a molar ratio of PET/MEA in Comparative Example 2 is 1 mol/0.3 mol.

Comparative Examples 3-7

A preparation method of Comparative Example 3 is similar to that of Example 9, except that no monoethanolamine was added in Comparative Example 3 (i.e., PET/MEA=1 mol/0 mol).

A preparation method of Comparative Example 4 is similar to that of Example 13, except that no monoethanolamine was added in Comparative Example 4 (i.e., PET/MEA=1 mol/0 mol).

A preparation method of Comparative Example 5 is similar to that of Example 14, except that no monoethanolamine was added in Comparative Example 5 (i.e., PET/MEA=1 mol/0 mol).

A preparation method of Comparative Example 6 is similar to that of Example 1, except that in Comparative Example 6, monoethanolamine was replaced with 8.9 g Jeffamine® D-230 (i.e., PET/Jeffamine® D-230 is 1 mol/0.03 mol).

A preparation method of Comparative Example 7 is similar to that of Example 1, except that in Comparative Example 7, monoethanolamine was replaced with 78.1 g Jeffamine® D-2000 (i.e., PET/Jeffamine® D-2000 is 1 mol/0.03 mol).

3. Analysis of Test Results

FIG. 1 is a nuclear magnetic resonance spectra of Example 1 of the present disclosure. The result was used to determine whether the polyether-ester product of Example 1 has an amide group, an amide group content in the polyether-ester product, and a residual amount of PET. Referring to FIG. 1, the position "e" ($\delta$8.3-8.4) shows the existence of N—H protons of an amide structure formed by the reaction of terephthalic acid (TPA). The amide structure was produced by monoethanolamine and poly(ethylene terephthalate) after depolymerization. Hence, the polyether-ester product of Example 1 has the amide structure. The amide group content in the polyether-ester product of Example 1 can be quantified from the nuclear magnetic resonance result as well. The value of the amide group content is listed in Table 1.

In addition, the residual amount of PET in the final polyether-ester products can be quantified from the nuclear magnetic resonance result of Example 1. When the residual amount of PET is small, a degree of depolymerization of PET is high. Referring to FIG. 1, the position "d" ($\delta$4.7-4.8) is the hydrogen of the ethylene glycol structure in PET. Hence, the residual amount of PET in the polyether-ester product of Example 1 can be quantified. The residual amount of PET is also listed in Table 1.

The molar ratio of PET/MEA in Comparative Example 2 is 1 mol/0.3 mol. There was no polymer successfully formed in Comparative Example 2 (where the intrinsic viscosity is less than 0.2 dL/g.) According to the nuclear magnetic resonance result of Comparative Example 2, the amide group content is 24.8%. It is speculated that since the amide content of Comparative Example 2 is excessively high, the heat resistance of the ester group was reduced, such that the ester group was degraded, and the polymer cannot be successfully formed.

TABLE 1

| | Addition amount of amine (mol %) | Amine value of depolymer (mg KOH/g) | Number average molecular weight of poly (tetramethylene ether) glycol (g/mol) | Residual amount of PET [1] (mol %) | Amide group content in polyether-ester product[2] (mol %) | Intrinsic viscosity (dL/g) |
|---|---|---|---|---|---|---|
| Example 1 | 3 | 4.83 | 1000 | 5.5 | 1.8 | 1.45 |
| Example 2[3] | 3 | 5.09 | 650 | 4.7 | 1.9 | 1.48 |
| Example 3[4] | 3 | 4.83 | 2000 | 5.3 | 1.8 | 1.41 |
| Example 4 | 3.5 | 5.90 | 1000 | 5.0 | 2.2 | 1.46 |
| Example 5 | 4 | 7.24 | 1000 | 4.1 | 2.7 | 1.43 |
| Example 6 | 5 | 9.39 | 1000 | 5.4 | 3.5 | 1.45 |
| Example 7 | 10 | 20.92 | 1000 | 4.7 | 7.8 | 1.35 |
| Example 8 | 20 | 43.71 | 1000 | 4.2 | 16.3 | 1.10 |
| Example 9 | 1 | 2.15 | 1000 | 4.5 | 0.8 | 1.51 |
| Example 10 | 1 | 2.07 | 1000 | 4.2 | 0.5 | 1.49 |

TABLE 1-continued

|  | Addition amount of amine (mol %) | Amine value of depolymer (mg KOH/g) | Number average molecular weight of poly (tetramethylene ether) glycol (g/mol) | Residual amount of PET [1] (mol %) | Amide group content in polyether-ester product[2] (mol %) | Intrinsic viscosity (dL/g) |
|---|---|---|---|---|---|---|
| Example 11 | 3 | 3.77 | 1000 | 5.7 | 1.7 | 1.41 |
| Example 12 | 3 | 3.40 | 1000 | 5.2 | 1.8 | 1.43 |
| Example 13 | 3 | 4.68 | 1000 | 5.0 | 1.7 | 1.46 |
| Example 14 | 3 | 4.48 | 1000 | 4.8 | 1.8 | 1.42 |
| Comparative Example 1 | 0 | 0.00 | 1000 | 7.0 | 0 | 1.41 |
| Comparative Example 2 | 30 | 66.50 | 1000 | 6.8 | 24.8 | 0.18 |
| Comparative Example 3 | 0 | 0.00 | 1000 | 10.0 | 0 | 1.40 |
| Comparative Example 4 | 0 | 0.00 | 1000 | 8.3 | 0 | 1.44 |
| Comparative Example 5 | 0 | 0.00 | 1000 | 7.9 | 0 | 1.42 |
| Comparative Example 6 | 3 | 5.64 | 1000 | 4.8 | 3.8 | 1.41 |
| Comparative Example 7 | 3 | 1.15 | 1000 | 5.0 | 4.4 | 1.44 |

[1] The residual amount of PET is the residual amount of PET in the product quantified from the nuclear magnetic resonance result. The smaller the residual amount of PET, the higher the degree of depolymerization.
[2] The amide group content in the polyether-ester product is the amide group content in the product quantified from the nuclear magnetic resonance analysis result.
[3] The preparation method of Example 2 is similar to that of Example 1, except that the number average molecular weight of the poly(tetramethylene ether glycol) was replaced by 650 g/mol.
[4] The preparation method of Example 3 is similar to that of Example 1, except that the number average molecular weight of the poly(tetramethylene etherglycol) was replaced by 2,000 g/mol.

Figure 2:
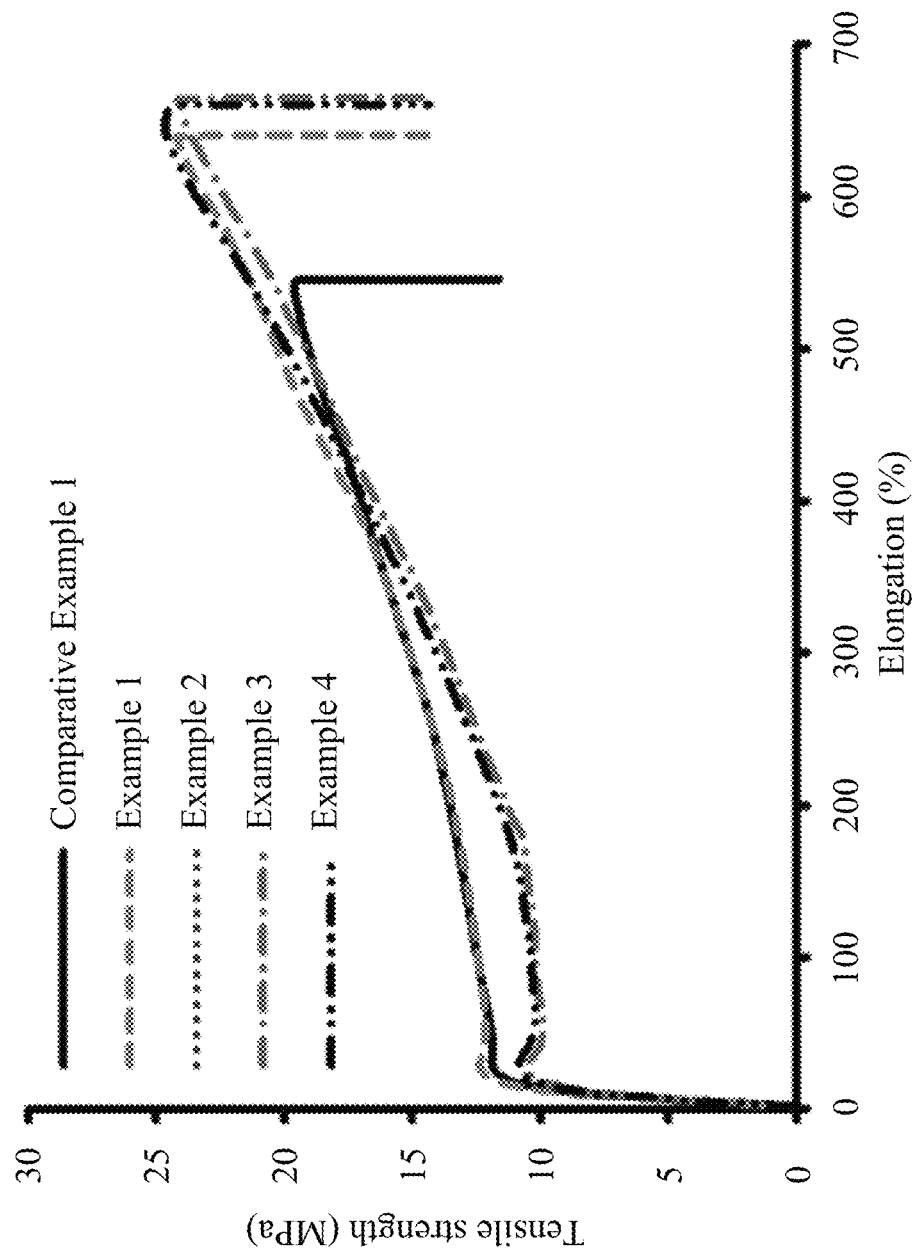
FIG. 2 is a stress-strain graph of Examples 1-4 and Comparative Example 1 in the present disclosure.

Next, the tensile testing machine was used to measure the tensile strength (in the unit of MPa) and elongation (in the unit of %) of the polymer. FIG. 2 is a stress-strain graph of Examples 1-4 and Comparative Example 1 of the present disclosure. The vertical axis is the tensile strength, and the horizontal axis is the elongation. The area under the curve of the tensile strength and the elongation shown in FIG. 2 can be used to further calculate the work of rupture of the polymer (in the unit of MJ/m$^3$). In addition, the dynamic mechanical analyzer was used to measure the glass transition temperature (Tg) of the hard and soft segments of the polymer. The glass transition temperature difference (Tg) between the hard and soft segments is the glass transition temperature of the hard segment (65° C.) minus that of the soft segment. The glass transition temperature difference (ΔTg) between the hard and soft segments can be obtained by calculation. The melting point (Tm) and enthalpy (ΔH) of the polymer can be measured by the differential scanning calorimeter. The measurement data is listed in Table 2.

TABLE 2

|  | Relative molar amount of amine[5] (mole) | Ratio of parts by weight of hard segment to soft segment (w/w) | Tg difference between hard and soft segments (ΔTg) (° C.) | Melting point Tm (° C.) | Enthalpy ΔH (J/g) | Tensile strength (MPa) | Elongation (%) | Work of rupture (MJ/m$^3$) |
|---|---|---|---|---|---|---|---|---|
| Example 1 | 0.03 | 61.7/38.3 | 105.8 | 184.2 | 24.8 | 23.8 | 627 | 104.5 |
| Example 2 | 0.03 | 62.7/37.3 | 99.9 | 179.7 | 22.5 | 23.3 | 602 | 92.9 |
| Example 3 | 0.03 | 59.1/40.9 | 122.8 | 187.9 | 21.7 | 24.2 | 588 | 90.7 |
| Example 4 | 0.035 | 60.3/39.7 | 105.7 | 180.6 | 25.1 | 23.4 | 629 | 100.7 |
| Example 5 | 0.04 | 62.5/37.5 | 106 | 184.3 | 22.6 | 24.4 | 661 | 101.1 |
| Example 6 | 0.05 | 58.4/41.6 | 107.8 | 182.5 | 22.9 | 24.7 | 658 | 103.4 |
| Example 7 | 0.1 | 60.1/39.9 | 103.5 | 185.3 | 23.9 | 23.0 | 597 | 95.4 |
| Example 8 | 0.2 | 59.8/40.2 | 104.7 | 186.1 | 24.1 | 21.4 | 560 | 90.3 |
| Comparative Example 1 | 0 | 61.6/38.4 | 92.1 | 184.1 | 24.3 | 19.4 | 543 | 80.1 |
| Comparative Example 2 | 0.3 | 58.9/41.1 | none | 160.3 | 32.7 | 1.3 | 9 | 0.08 |

[5] The relative molar amount of the amine is referred to the relative molar amount of the amine group content, based on 1 mole of the total amount of the polyester.

Regarding the ratio of the hard segment to the soft segment, the positions "i," "j," and "f" in FIG. 1 are hydrogen at different positions of the structure of poly(tetramethylene ether) glycol, the position "a" (δ8.1-8.2) is hydrogen in terephthalic acid, the positions "b" (δ4.5-4.6) and "c" (δ2-2.1) are hydrogen in different positions of butanediol, the position "d" (δ4.7-4.8) is hydrogen in ethylene glycol, and the position "e" (δ8.3-8.4) is hydrogen in ethanolamine. The poly(tetramethylene ether) glycol is regarded as the soft segment, and other monomers are regarded as the hard segment. The molar ratio of the soft and hard segments was calculated. The ratio of the hard segment to the soft segment, in parts by weight, can thus be calculated from the molecular weight of each of the monomers. The test data is listed in Table 2.

Figure 3:
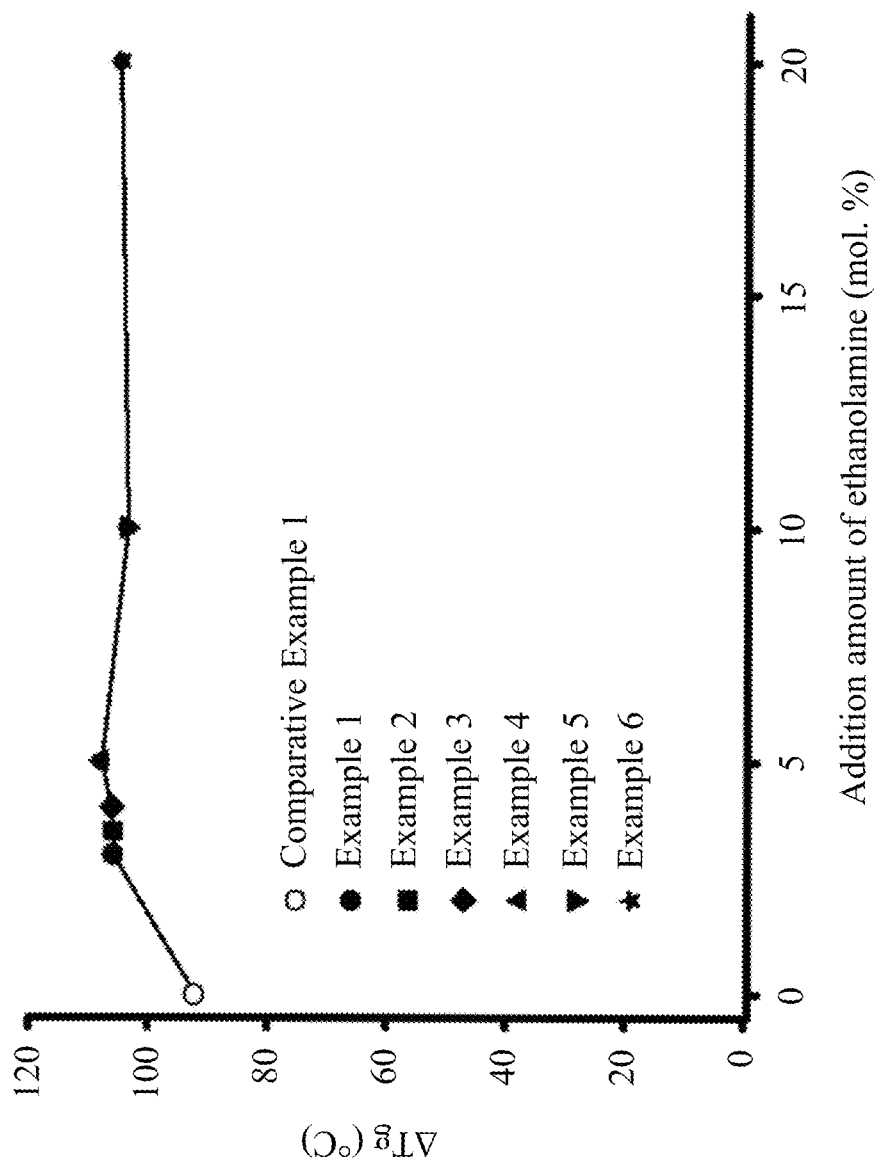
FIG. 3 is a graph illustrating the relationship between an addition amount of ethanolamine and a glass transition temperature difference ($\Delta Tg$) between hard and soft segments of Examples 1-6, Comparative Example 1 and Comparative Example 2 in the present disclosure.

As shown in FIG. 2 and Table 2, compared with the polymer without the amide group in Comparative Example 1, the polyether-ester containing the amide group of Examples 1-4 all have higher tensile strength, elongation and work of rupture. This is because the polyether-ester containing the amide group of Examples 1-4 has a higher microphase separation. The microphase separation can be determined from the glass transition temperature difference (ΔTg) between the hard and soft segments. The greater the glass transition temperature difference, the higher the microphase separation. As shown in Table 2 and FIG. 3, compared with Comparative Example 1, the polyether-ester containing the amide group of Examples 1-4 has a higher glass transition temperature difference (ΔTg) between the hard and soft segments. Therefore, the microphase separation of the polyether-ester containing the amide group of Examples 1-4 is relatively high. In other words, as shown in Table 2, compared with the polymer without the amide group of Comparative Example 1, the polyether-ester containing the amide group of Examples, which have similar parts by weight ratio of the hard segment and the soft segment, all have higher tensile strength, elongation and work of rupture.

TABLE 3

|  | Relative molar amount of amine | Ratio of parts by weight of hard segment to soft segment (w/w) | Tg difference between hard and soft segments (ΔTg) (° C.) | Melting point Tm (° C.) | Enthalpy ΔH (J/g) | Tensile strength (MPa) | Elongation (%) | Work of rupture (MJ/m³) |
|---|---|---|---|---|---|---|---|---|
| Example 9 | 0.01 | 83.2/16.8 | 162 | 192.3 | 30.9 | 37.4 | 443 | 106.3 |
| Example 10 | 0.01 | 95.5/4.5 | 163.1 | 197.7 | 27.6 | 40.4 | 428 | 102.3 |
| Comparative Example 3 | 0 | 85.2/14.8 | 159.4 | 181.9 | 29.5 | 32.5 | 417 | 69.2 |

The preparation method of Example 9 is similar to that of Example 1, except that the addition amount of poly(tetramethylene ether) glycol was reduced to 50 g. The preparation method of Comparative Example 3 is similar to that of Example 9, except that no monoethanolamine is added in Comparative Example 3. As shown in Table 2, the polyether-ester in Example 9, which has a small amount of the amide group has higher tensile strength, elongation and work of rupture, compared with the product in Comparative Example 3, which does not have the amide group.

The preparation method of Example 10 is similar to that of Example 9, except that the addition amount of poly(tetramethylene ether) glycol was reduced to 31 g. The polyether-ester in Example 10, which has a small amount of the amide group, has higher tensile strength, elongation and work of rupture, compared with the product in Comparative Example 3, which does not have the amide group.

TABLE 4

|  | Relative molar amount of amine | Ratio of parts by weight of hard segment to soft segment (w/w) | Tg difference between hard and soft segments (ΔTg) (° C.) | Melting point Tm (° C.) | Enthalpy ΔH (J/g) | Tensile strength (MPa) | Elongation (%) | Work of rupture (MJ/m³) |
|---|---|---|---|---|---|---|---|---|
| Example 11 | 0.03 | 61.0/39.0 | 103.3 | 181.5 | 21.8 | 22.5 | 623 | 98.1 |
| Example 12 | 0.03 | 60.3/39.7 | 103.9 | 182.1 | 22.5 | 22.0 | 617 | 96.0 |
| Comparative Example 6 | 0.03 | 60.8/39.2 | 84.3 | 176.4 | 20.0 | 16.8 | 427 | 51.4 |
| Comparative Example 7 | 0.03 | 61.2/38.8 | 70.7 | 168.2 | 19.2 | 13.1 | 332 | 31.2 |

The preparation method of Example 11 is similar to that of Example 1, except that monoethanolamine was replaced with diethanolamine. The preparation method of Example 12 is similar to that of Example 1, except that monoethanolamine was replaced with triethanolamine. The tensile strength of the related products of Examples is greater than 20 MPa, the elongation thereof is greater than 400%, and the work of rupture thereof is greater than 90 MJ/m³. The preparation methods of Comparative Examples 6 and 7 are similar to that of Example 1, except that in Comparative Example 6, an alcohol with two terminal amine functional groups was used. The alcohol in Comparative Example 6 has a structure is significantly different from the monoamino alcohol used in the present disclosure. In Comparative Example 6, polyoxyalkylene diamine in the trade name of Jeffamine® D-230 was used. In Comparative Example 7, polyoxyalkylene diamine in the trade name of Jeffamine® D-2000 was used. Compared with Examples 1, 11 and 12, the tensile strength, elongation and work of rupture of Comparative Examples 6 and 7 are significantly decreased.

TABLE 5

| | Relative molar amount of amine | Ratio of parts by weight of hard segment to soft segment (w/w) | Tg difference between hard and soft segments (ΔTg) (° C.) | Melting point Tm (° C.) | Enthalpy ΔH (J/g) | Tensile strength (MPa) | Elongation (%) | Work of rupture (MJ/m³) |
|---|---|---|---|---|---|---|---|---|
| Example 13 | 0.03 | 59.7/40.3 | 107.5 | 143.8 | 13.6 | 20.7 | 672 | 97.8 |
| Comparative Example 4 | 0 | 60.4/39.6 | 90.3 | 140.4 | 12.0 | 19.1 | 541 | 72.9 |

The preparation method of Example 13 is similar to that of Example 1, except that 1,4-butanediol was replaced with a mixture of 1,4-butanediol and neopentyl glycol. The tensile strength of Example 13 is greater than 20 MPa, the elongation thereof is greater than 400%, the work of rupture thereof is greater than 90 MJ/m³. The preparation method of Comparative Example 4 is similar to that of Example 13, except that no monoethanolamine was added in Comparative Example 4 (i.e., PET/MEA=1 mol/0 mol). Compared with Comparative Example 4, Example 13 has higher tensile strength, elongation and work of rupture.

TABLE 6

| | Relative molar amount of amine | Ratio of parts by weight of hard segment to soft segment (w/w) | Tg difference between hard and soft segments (ΔTg) (° C.) | Melting point Tm (° C.) | Enthalpy ΔH (J/g) | Tensile strength (MPa) | Elongation (%) | Work of rupture (MJ/m³) |
|---|---|---|---|---|---|---|---|---|
| Example 14 | 0.03 | 60.9/39.1 | 108.1 | 131.0 | 12.4 | 20.5 | 680 | 98.2 |
| Comparative Example 5 | 0 | 60.7/39.3 | 86.9 | 128.7 | 11.5 | 17.4 | 539 | 67.5 |

The preparation method of Example 14 is similar to that of Example 1, except that 1,4-butanediol was replaced with a mixture of 1,4-butanediol, 1,6-hexanediol and neopentyl glycol. The tensile strength of Example 14 is greater than 20 MPa, the elongation thereof is greater than 400%, and the work of rupture thereof is greater than 90 MJ/m³. The preparation method of Comparative Example 5 is similar to that of Example 14, except that no monoethanolamine was added in Comparative Example 4 (i.e., PET/MEA=1 mol/0 mol).

The polyether-ester, which has a small amount of amide group, in Example 14 has higher tensile strength, elongation and work of rupture, compared with the product, which does not have the amide group, in Comparative Example 5.

In the method of the present disclosure, an additional dibasic acid is not required for esterification, and the depolymerization is performed with the use of an environmentally friendly titanium catalyst. A weight ratio of amine to alcohol in the method of the present disclosure also differs from that of the related art. Therefore, it shall be apparent to a person skilled in the art that there are significant differences between the related art and the present disclosure.

Although the present disclosure has been disclosed as above in preferred embodiments, it is not intended to limit the present disclosure. It is to be understood that those skilled in the art can make various changes and modifications without departing from the spirit and scope of the present disclosure. Therefore, the scope of protection of the present disclosure is subject to the definition of the scope of claims.

What is claimed is:

1. A method of preparing an amide-group containing polyether-ester material, comprising the steps of:
   (1) mixing a polyester, a monoamino alcohol, and a hydroxyalkane to form a first mixture, wherein based on 1 mole of a total amount of the polyester, a relative molar amount of the monoamino alcohol is in a range of 0.01 to 0.2 mole, the monoamino alcohol is selected from the group consisting of monoethanolamine, diethanolamine, n-propanolamine, isopropanolamine, n-butanolamine, isobutanolamine, and any combinations thereof, and the hydroxyalkane is selected from the group consisting of ethylene glycol, diethylene glycol, triethylene glycol, 1,2-propanediol, 1,3-propanediol, 1,2-butanediol, 1,3-butanediol, 1,4-butanediol, 1,5-pentanediol, 1,6-hexanediol, 2-methyl-1,3-propanediol, neopentyl glycol, and any combinations thereof;

(2) heating the first mixture to proceed a depolymerization reaction and then to form a depolymerization product, wherein an amine value of the depolymerization product is in a range of 1.3 to 54 mg KOH/g;

(3) mixing the depolymerization product and a hydroxyalkane oligomer to form a second mixture; and (4) performing a condensation polymerization reaction of the second mixture to obtain an amide-group containing polyether-ester material.

2. The method of claim 1, wherein the polyester has a benzene ring structure comprising a para substituent, a meta substituent, or a combination thereof.

3. The method of claim 1, wherein the polyester is obtained by an esterification reaction of a carboxylic acid and an alcohol, or is obtained by plastic recycling.

4. The method of claim 1, wherein an amine group content of the monoamino alcohol is at least 5 meq/g.

5. The method of claim 4, wherein the amine group content of the monoamino alcohol is in a range of 5 meq/g to 30 meq/g.

6. The method of claim 1, wherein a number average molecular weight of the hydroxyalkane oligomer is in a range of 600 to 2,000.

7. The method of claim 1, wherein the hydroxyalkane oligomer is selected from the group consisting of poly(ethylene glycol), poly(trimethylene ether) glycol, and poly(tetramethylene ether) glycol.

8. The method of claim 1, wherein the step (1) comprises adding a first catalyst, and the first catalyst is a monovalent metal compound, a divalent metal compound, or a combination thereof excluding a tin-containing metal compound.

9. The method of claim 1, wherein the step (1) comprises adding a first catalyst, and the first catalyst is a titanium-containing compound, an antimony-containing compound, or a combination thereof.

10. The method of claim 1, wherein the second mixture of the step (3) further comprises an antioxidant.

11. The method of claim 1, wherein the step (3) comprises adding a second catalyst, and the second catalyst is a monovalent metal compound, a divalent metal compound, or a combination thereof excluding a tin-containing metal compound.

12. The method of claim 1, wherein the step (3) comprises adding a second catalyst, and the second catalyst is a titanium-containing compound, an antimony-containing compound, or a combination thereof.

13. The method of claim 1, wherein the step (4) comprises heating the second mixture at a temperature in a range of 230° C. to 250° C.

* * * * *